United States Patent
Horiuchi et al.

(10) Patent No.: US 10,629,340 B2
(45) Date of Patent: *Apr. 21, 2020

(54) PERMANENT MAGNET, AND MOTOR AND POWER GENERATOR USING THE SAME

(71) Applicant: KABUSHIKI KAISHA TOSHIBA, Minato-ku, Tokyo (JP)

(72) Inventors: Yosuke Horiuchi, Tokyo (JP); Shinya Sakurada, Tokyo (JP); Tsuyoshi Kobayashi, Kanagawa-ken (JP); Keiko Okamoto, Kanagawa-ken (JP); Masaya Hagiwara, Kanagawa-ken (JP); Masaki Endo, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 251 days.

This patent is subject to a terminal disclaimer.

(21) Appl. No.: 14/076,383

(22) Filed: Nov. 11, 2013

(65) Prior Publication Data
US 2014/0139064 A1     May 22, 2014

(30) Foreign Application Priority Data
Nov. 20, 2012    (JP) ................................. 2012-254746

(51) Int. Cl.
    *H01F 1/01*            (2006.01)
    *H01K 1/02*           (2006.01)
    (Continued)

(52) U.S. Cl.
CPC .............. *H01F 1/01* (2013.01); *C22C 38/005* (2013.01); *H01F 1/0557* (2013.01); *H02K 1/02* (2013.01)

(58) Field of Classification Search
CPC ....... H01F 1/0557; H01F 1/0596; H01F 1/055
See application file for complete search history.

(56) References Cited

U.S. PATENT DOCUMENTS

| | | | |
|---|---|---|---|
| 4,746,378 A | 5/1988 | Wysiekierski et al. | |
| 6,451,132 B1 * | 9/2002 | Walmer | H01F 1/055 148/301 |

(Continued)

FOREIGN PATENT DOCUMENTS

| | | |
|---|---|---|
| CN | 102447314 | 5/2012 |
| EP | 2048772 | 4/2009 |

(Continued)

OTHER PUBLICATIONS

Huang et al. (J of Applied Physics, 1994, vol. 75, p. 6280-6282).*

(Continued)

*Primary Examiner* — Xiaowei Su
(74) *Attorney, Agent, or Firm* — Amin, Turocy & Watson, LLP (57) ABSTRACT

In one embodiment, a permanent magnet includes: a composition expressed by $R_p Fe_q M_r Cu_s Co_{100-p-q-r-s}$ (R is a rare-earth element, M is at least one element selected from Zr, Ti, and Hf, $10 \leq p \leq 13.5$ at %, $25 \leq q \leq 40$ at %, $1.35 \leq r \leq 1.75$ at %, and $0.88 \leq s \leq 13.5$ at %); and a metallic structure including $Th_2Zn_{17}$ crystal phases each having a Fe concentration of 25 at % or more, and Cu-rich crystal phases each having a Cu concentration of from 25 at % to 70 at %. An average thickness of the Cu-rich crystal phases is 20 nm or less, and an average distance between the Cu-rich crystal phases is 200 nm or less.

12 Claims, 2 Drawing Sheets

(51) Int. Cl.
  *H01F 1/055* (2006.01)
  *C22C 38/00* (2006.01)
  *H02K 1/02* (2006.01)

(56) References Cited

U.S. PATENT DOCUMENTS

| | | |
|---|---|---|
| 8,179,068 B2 | 5/2012 | Yuuki et al. |
| 8,552,678 B2 | 10/2013 | Yuuki et al. |
| 2012/0074804 A1 | 3/2012 | Horiuchi et al. |
| 2012/0146444 A1 | 6/2012 | Horiuchi et al. |
| 2012/0242180 A1 | 9/2012 | Horiuchi et al. |
| 2013/0241682 A1* | 9/2013 | Horiuchi ............... H01F 1/0557 335/302 |
| 2015/0270040 A1* | 9/2015 | Horiuchi ................. C22C 19/07 310/152 |

FOREIGN PATENT DOCUMENTS

| | | | |
|---|---|---|---|
| JP | 5-295489 | 11/1993 | |
| JP | 06-212327 | 8/1994 | |
| JP | 09-111383 | 4/1997 | |
| JP | 2008-029148 | 2/2008 | |
| JP | 2008-043172 | 2/2008 | |
| JP | WO 2011016089 A1 * | 2/2011 | ............. C22C 19/07 |
| JP | 2011-216716 | 10/2011 | |
| JP | 2012-69750 | 4/2012 | |

OTHER PUBLICATIONS

Xiong et al. (The microstructure of sintered Sm(Co0.72Fe0.20Cu0.055Zr0.025)7.5 permanent magnet studied by atom probe, Acta Materialia, vol. 52, Issue 3, Feb. 9, 2004, pp. 737-748).*
Liu et al., IEEE Transactions on Magnetics, 1989, vol. 25, p. 3785-3787.*
Chinese Office Action for Chinese Patent Application No. 201310585748.8 dated Sep. 28, 2015.
European Search Report for Application No. 13193279.0-1556 dated Apr. 2, 2014, 6 pgs.
Gopalan, et al. "Studies on structural transformation and magnetic properties in Sm2Co17 type alloys". Journal of Materials Science, Sep. 1, 2001, pp. 4117-4123, XP055109597, Retrieved from the Internet: URL: http://rd.springer.com/content/pdf/10.1023/A:1017992132473.pdf (retrieved on Mar. 24, 2014).
Japanese Office Action for Japanese Patent Application No. 2012-254746 dated Jul. 26, 2016.
Japanese Office Action for Japanese Patent Application No. 2012-254746 dated Feb. 21, 2017.
Mishra, et al, Microstructure and Properties of Step Aged Rare Earth Alloy Magnets, J. Appl. Phys. 52 (3), Mar. 1981; pp. 2517-2519.
Lefevre, et al, Optimisation of 2/17 Permanent Magents using the Quinary Sm—Co—Cu—Fe—Zr Phase Diagram, Journal of Alloys and Compounds, 275-277; 1998; pp. 556-559.

* cited by examiner

PERMANENT MAGNET, AND MOTOR AND POWER GENERATOR USING THE SAME

CROSS REFERENCE TO RELATED APPLICATION

This application is based upon and claims the benefit of priority from Japanese Patent Application No. 2012-254746, filed on Nov. 20, 2012; the entire contents of which are incorporated herein by reference.

FIELD

Embodiments disclosed herein generally relate to a permanent magnet, and a motor and a power generator using the same.

BACKGROUND

As high-performance rare-earth magnets, there have been known a Sm—Co-based magnet, a Nd—Fe—B-based magnet, and the like. These magnets currently mass-produced contain a large amount of iron (Fe) and cobalt (Co), which contributes to an increase in saturation magnetization. Further, these magnets contain rare-earth elements such as neodymium (Nd) and samarium (Sm), and high magnetic anisotropy is brought about ascribable to behaviors of 4f electrons of the rare-earth elements in a crystal field. This makes it possible to obtain a high coercive force to realize a high-performance magnet.

Such high-performance magnets are used in electric devices such as various kinds of motors, power generators, speakers, and measuring instruments. In recent years, there is an increasing demand for a reduction in weight and a reduction in power consumption of various kinds of electric devices, and in order to cope with this, there is a demand for a higher-performance permanent magnet whose maximum magnetic energy product ($BH_{max}$) is improved. When a permanent magnet is used for motors of a hybrid electric vehicle (HEV), an electric vehicle (EV), a railway car, and the like, the permanent magnet is required to have high heat resistance. In a motor for HEV, EV, a railway car, or the like, a permanent magnet whose heat resistance is enhanced by Dy substituting for part of Nd of a Nd—Fe—B-based magnet is used. Since Dy is one of rare-earth elements, there is a demand for a permanent magnet using no Dy in accordance with a large-scale use of motors for HEV and EV.

It is known that the Sm—Co-based magnet exhibits excellent heat resistance without using Dy because of its high Curie temperature. The Sm—Co-based magnet is capable of realizing a good motor characteristic and so on under high temperatures, but a further increase in its coercive force and a further increase in its magnetic flux density are now in need. To increase the magnetic flux density of the Sm—Co-based magnet, it is effective to increase a Fe concentration. However, in a composition range where the Fe concentration is high, the coercive force tends to decrease. Further, the increase in the Fe concentration is likely to cause the generation of a hetero-phase and makes it difficult to obtain a sufficient sintered compact density. These become factors of lowering a coercive force and magnetization. In order to realize a high-performance permanent magnet, there has been a demand for an art to realize both a high coercive force and high magnetization in a Sm—Co-based magnet having a high Fe concentration.

DETAILED DESCRIPTION

According to one embodiment, there is provided a permanent magnet including: a composition expressed by a composition formula:

$$R_p Fe_q M_r Cu_s Co_{100-p-q-r-s} \quad (1)$$

wherein R is at least one element selected from the group consisting of rare-earth elements, M is at least one element selected from the group consisting of Zr, Ti, and Hf, p satisfies $10 \leq p \leq 13.5$ at %, q satisfies $25 \leq q \leq 40$ at %, r satisfies $1.35 \leq r \leq 1.75$ at %, and s satisfies $0.88 \leq s \leq 13.5$ at %; and a metallic structure including $Th_2 Zn_{17}$ crystal phases each having a Fe concentration of 25 at % or more and Cu-rich crystal phases each having a Cu concentration of from 25 at % to 70 at %. In the permanent magnet of the embodiment, an average thickness $t_{Cu\text{-}rich}$ of the Cu-rich crystal phases is 20 nm or less, and an average distance $d_{Cu\text{-}rich}$ between the Cu-rich crystal phases is 200 nm or less.

It is known that a coercive force mechanism of a Sm—Co-based magnet is generally a domain wall pinning type. The domain wall pinning-type coercive force originates from a nano-order two-phase separation structure generated by heat treatment. The two-phase separation structure is composed of a $Th_2 Zn_{17}$ crystal phase (also called a cell phase. Hereinafter, referred to as a 2-17 phase) and a Cu-rich crystal phase (also called a cell wall phase. Hereinafter referred to as a Cu-rich phase) formed to surround the 2-17 phase. The Cu-rich phase works as a pinning site of a domain wall to prevent the displacement of the domain wall. Consequently, the domain wall pinning-type coercive force is exhibited. The Cu-rich phase is mainly composed of a $CaCu_5$ crystal phase (hereinafter referred to as a 1-5 phase).

When the Fe concentration of the Sm—Co-based magnet becomes high, it tends to be difficult for the aforesaid coercive force to be exhibited. A possible reason for this is that the Cu-rich phase being the pinning site is difficult to be generated. Regarding such a point, there is a historical background that, by adding zirconium (Zr), it has been conventionally possible to obtain a coercive force even in a composition range where the Fe concentration is high. The addition of Zr to the Sm—Co-based magnet causes the generation of a Zr-rich platelet phase prior to the two-phase separation into the 2-17 phase and the Cu-rich phase caused by spinodal decomposition occurring during aging. The Zr-rich platelet phase works as a diffusion path of elements to promote the diffusion of the elements, so that the two-phase separation structure is easily generated. A Zr concentration of a conventional Sm—Co-based magnet whose Fe concentration is about 15 at % is about 0.7 at % to about 0.9 at %.

Further, by setting the Zr concentration to about 2 at % to about 2.5 at %, a good coercive force is obtained in a Sm—Co-based magnet whose Fe concentration is increased nearly to 25 at %. A conventional typical Sm—Co-based magnet contains about 20 at % Fe and also contains about 2 at % Zr. From such a historical background, it is expected that the coercive force of the Sm—Co-based magnet whose Fe concentration is increased is improved by increasing the Zr concentration in accordance with the Fe concentration. Actually, however, the coercive force does not increase even when the content of Zr is increased in accordance with the Fe amount in order to increase the coercive force of a Sm—Co-based magnet containing 25 at % Fe or more. On the contrary, the coercive force tends to decrease and further residual magnetization also decreases. According to the conventional way of thinking for increasing the coercive force, less than 25 at % is a limit to increasing the Fe concentration of the Sm—Co-based magnet.

The present inventors have studiously studied a reason why the coercive force decreases when the Fe concentration of the Sm—Co-based magnet is set to 25 at % or more. As a result, it has been found out that in a conventional R—Co—Fe—Cu-M-based magnet (R is a rare-earth element and M is at least one element selected from Ti, Zr, and Hf), for example, in a Sm—Co—Fe—Cu—Zr-based magnet, a Zr-rich hetero-phase is likely to be generated. When the Fe concentration increases, solubility limit of Zr in the Sm—Co—Fe—Cu—Zr-based magnet decreases, and Zr not completely solid-dissolved generates the hetero-phase. Accordingly, even when Zr in an amount of about 2 at % which has been conventionally considered as an appropriate amount is added to the Sm—Co—Fe—Cu—Zr-based magnet containing 25 at % Fe or more, Zr does not fully function for increasing the coercive force. It has also been found out that the Zr-rich hetero-phase also has a relatively high Cu concentration. When the Cu concentration in the Zr-rich hetero-phase becomes high, a main phase becomes deficient in Cu, and the spinodal decomposition which should occur during the aging is obstructed. It is conjectured that the generation of the Zr-rich hetero-phase also causes deterioration in magnetization.

As described above, regarding an ordinary Sm—Co-based magnet containing about 20 at % Fe and about 2 at % Zr, it is expected, based on the conventional way of thinking, that increasing the Zr concentration is effective for promoting a further increase in the Zr concentration. However, from the viewpoint of the metallic structure, it has been found out that it is difficult to realize the increase in the Fe concentration by increasing the Zr concentration. Therefore, the present inventors focused attention on the composition with a low Zr concentration which, based on the conventional way of thinking, is expected to decrease the coercive force, in the composition range having a 25 at % Fe concentration or more. The present inventors have studiously studied an art that makes a high coercive force exhibited in a composition range where the Zr concentration is low enough to suppress the generation of the hetero-phase.

A possible reason why a sufficient coercive force is not exhibited in the composition range with the low Zr concentration in the conventional Sm—Co-based magnet is that the spinodal decomposition during the aging becomes insufficient. The insufficient spinodal decomposition results in a deficiency in a generation amount of the Cu-rich phase being the pinning site of the domain wall. The phase separation in an alloy system forming the Sm—Co-based magnet is two-phase separation from a $TbCu_7$ crystal phase (hereinafter referred to as a 1-7 phase) formed by solution treatment into the 2-17 phase (cell phase) and the Cu-rich phase (cell wall phase). At the time of the phase separation, interdiffusion of Cu and Fe, Co occurs. Cu diffuses into the Cu-rich phase and Fe diffuses into the 2-17 phase. When an element M such as Zr is added, a platelet phase composed of an M-rich hetero-phase (hereinafter referred to as an M-rich phase) is generated prior to the two-phase separation. The M-rich phase is usually generated in a direction perpendicular to a c-axis of the 2-17 phase. The M-rich phase serves as a diffusion path of the elements to promote the diffusion of the elements, so that the phase separation is easily caused.

In a Sm—Co-based magnet whose Fe concentration is about 20 at % (less than 25 at %), the generation of the M-rich phase makes the phase separation easy, so that a generation amount of the Cu-rich phase increases. However, in a Sm—Co-based magnet having 25 at % or more of Fe concentration, the solubility limit of the element M decreases and the generation amount of the M-rich phase increases as described above. The increase in the generation amount of the M-rich phase results in a deficiency in Cu in the main phase to obstruct the spinodal decomposition on the contrary. Therefore, in order to increase the coercive force of the Sm—Co-based magnet having 25 at % or more of Fe concentration, it is important to make the two-phase separation sufficiently progress in a composition range where the concentration of the element M (hereinafter referred to as the M concentration) is low enough to suppress the generation of the M-rich phase.

According to the permanent magnet of the embodiment, in the composition range where the Fe concentration is 25 at % or more, the M concentration is set to 1.75 at % or less to suppress the generation of the M-rich phase, and it is made possible for the two-phase separation to sufficiently progress in the composition range with 1.75 at % or less of the M concentration. The two-phase separation caused by the aging progresses by promoting the interdiffusion of Cu and Fe, Co. As will be described in detail later, when an amount of vacancies that cause the progress of the interdiffusion of the elements is increased in a material having undergone the solution treatment, it is possible to promote the interdiffusion of Cu and Fe, Co without any intervention of the M-rich phase. In a composition range where the M concentration is 1.75 at % or less, the generation of the M-rich phase is suppressed and the two-phase separation into the 2-17 phase and the Cu-rich phase is promoted. Therefore, the coercive force of the Sm—Co-based magnet having 25 at % or more of Fe concentration improves. Further, a pinning force that the Cu-rich phase itself has for the domain wall is strengthened, so that the coercive force of the Sm—Co-based magnet improves. Based on the Fe concentration of 25 at % or more, the residual magnetization of the Sm—Co-based magnet improves.

The permanent magnet of the embodiment will be described in detail below. In the permanent magnet having the composition expressed by the composition formula (I), as the element R, at least one element selected from rare-earth elements including yttrium is used. The elements R all bring about high magnetic anisotropy and impart a high coercive force to the permanent magnet. As the element R, at least one kind selected from samarium (Sm), cerium (Ce), neodymium (Nd), and praseodymium (Pr) is preferably used, and the use of Sm is especially desirable. Setting a ratio of Sm in the element R to 50 at % or more makes it possible to increase the coercive force and so on of the permanent magnet with good reproducibility. Further, about 70 at % or more of the element R is desirably Sm.

When the content of the element R is too low, it is not possible to obtain a sufficient coercive force because a large amount of an α-Fe phase precipitates. When the content of the element R is too high, saturation magnetization greatly decreases. Therefore, the content p of the element R is preferably within a range of 10 at % to 13.5 at %. The content p of the element R is more preferably within a range of 10.3 at % to 13 at %, and still more preferably 10.6 at % to 12.5 at %.

Iron (Fe) is an element mainly responsible for the magnetization of the permanent magnet. By making a large amount of Fe contained, it is possible to increase saturation magnetization of the permanent magnet. However, when the content of Fe is excessively high, the α-Fe phase precipitates and it is difficult to obtain a desired two-phase separation structure, which is liable to lower the coercive force. Therefore, the content q of Fe is preferably within a range of 25 at % to 40 at %. The content q of Fe is more preferably within a range of 28 at % to 38 at %, and still more preferably within a range of 30 at % to 36 at %.

As the element M, at least one element selected from titanium (Ti), zirconium (Zr), and hafnium (Hf) is used. Compounding the element M makes it possible for a high coercive force to be exhibited in the composition range having a high Fe concentration. When a content of the element M is too low, it is not possible to obtain the effect of improving the coercive force. The content r of the element M is preferably 1.35 at % or more. In the permanent magnet of the embodiment, it is important to suppress the generation of the M-rich phase in the composition range containing 25 at % Fe or more. Therefore, the content r of the element M is preferably 1.75 at % or less. When the content r of the element M is over 1.75 at %, the coercive force and the magnetization both deteriorate. The content r of the element M is more preferably within a range of 1.4 at % to 1.7 at %, and still more preferably within a range of 1.5 at % to 1.67 at %.

The element M may be any of Ti, Zr, and Hf, but preferably contains at least Zr. Especially when 50 at % or more of the element M is Zr, it is possible to further improve the effect of enhancing the coercive force of the permanent magnet. On the other hand, Hf in the element M is especially expensive, and therefore, even when Hf is used, its amount used is preferably small. A content of Hf is preferably set to less than 20 at % of the element M.

Copper (Cu) is an element for causing the permanent magnet to exhibit a high coercive force. When a content of Cu is too low, it is difficult to obtain a high coercive force. When the content of Cu is too high, the magnetization greatly lowers. Therefore, the content s of Cu is preferably within a range of 0.88 at % to 13.5 at %. The content s of Cu is more preferably within a range of 3.9 at % to 9 at %, and still more preferably within a range of 4.3 at % to 7.2 at %.

Cobalt (Co) is an element not only responsible for the magnetization of the permanent magnet but also necessary for causing a high coercive force to be exhibited. Further, when a large amount of Co is contained, a Curie temperature becomes high, which improves thermal stability of the permanent magnet. When the content of Co is too low, it is not possible to sufficiently obtain these effects. However, when the content of Co is excessively high, the content of Fe relatively lowers, which deteriorates the magnetization. Therefore, the content of Co is set in consideration of the contents of the element R, the element M, and Cu so that the content of Fe satisfies the aforesaid range.

Part of Co may be substituted for by at least one kind of element A selected from nickel (Ni), vanadium (V), chromium (Cr), manganese (Mn), aluminum (Al), silicon (Si), gallium (Ga), niobium (Nb), tantalum (Ta), and tungsten (W). These substitution elements contribute to improvement in magnetic property, for example, the coercive force. However, the excessive substitution by the element A for Co is liable to cause the deterioration of the magnetization, and therefore, an amount of the substitution by the element A is preferably 20 at % or less of an amount of Co. Note that it is permissible that the permanent magnet of the embodiment contains inevitable impurities such as an oxide.

The permanent magnet of the embodiment includes the metallic structure including the 2-17 phases (cell phases) each having 25 at % or more of Fe concentration, and the Cu-rich phases (cell wall phases) each having 25 at % to 70 at % of Cu concentration. When the Fe concentration of the 2-17 phase is less than 25 at %, it is not possible to sufficiently increase the residual magnetization of the permanent magnet. The Fe concentration of the 2-17 phase is preferably 28 at % or more, and more preferably 30 at % or more. The Cu-rich phase (cell wall phase) functions as the pinning site of the domain wall as described above. When the Cu concentration of the Cu-rich phase is 25 at % or more, its function as the pinning site of the domain wall improves. If the Cu concentration is over 70 at %, a crystal structure of the Cu-rich phase becomes unstable, and the Cu-rich phase cannot be stably generated. The Cu concentration of the Cu-rich phase is preferably 30 at % to 65 at %, and more preferably 35 at % to 60 at %.

In the permanent magnet of the embodiment, the average thickness $t_{Cu\text{-}rich}$ of the Cu-rich phases is 20 nm or less, and the average distance $d_{Cu\text{-}rich}$ between the Cu-rich phases is 200 nm or less. The average thickness $t_{Cu\text{-}rich}$ of the Cu-rich phases and the average distance $d_{Cu\text{-}rich}$ between the Cu-rich phases are measured on a cross section including a c axis of a crystal of the 2-17 phase. When the average thickness $t_{Cu\text{-}rich}$ of the Cu-rich phases and the average distance $d_{Cu\text{-}rich}$ between the Cu-rich phases satisfy the aforesaid conditions, the clear pinning site (Cu-rich phase) of the domain wall is densely formed. In the permanent magnet whose magnetization is increased by setting the Fe concentration of the 2-17 phase (cell phase) to 25 at % or more, a good coercive force can be exhibited. That is, it is possible to provide a Sm—Co-based magnet having high residual magnetization and a high coercive force.

When the average thickness $t_{Cu\text{-}rich}$ of the Cu-rich phases is too large on the cross section including the c axis of the 2-17 phase, Cu disperses in the Cu-rich phase. This weakens the pinning force that the Cu-rich phase has for the domain wall. Since the Cu-rich phases having 20 nm or less of the average thickness $t_{Cu\text{-}rich}$ are excellent in the pinning force of the domain wall, the coercive force of the permanent magnet improves. The average thickness $t_{Cu\text{-}rich}$ of the Cu-rich phases is preferably 16 nm or less, and more preferably 12 nm or less. However, when the average thickness $t_{Cu\text{-}rich}$ of the Cu-rich phases is too small, its function as the pinning site of the domain wall tends to lower and also the pinning force of the domain wall also tends to weaken. The average thickness $t_{Cu\text{-}rich}$ of the Cu-rich phases is preferably 4 nm or more.

When the average distance $d_{Cu\text{-}rich}$ between the Cu-rich phases is too large, a formation state of the pinning site of the domain wall becomes scarce, so that the coercive force of the permanent magnet lowers. Further, a squareness ratio of the permanent magnet also tends to worsen. When the average distance $d_{Cu\text{-}rich}$ between the Cu-rich phases is 200 nm or less, the pinning site of the domain wall becomes dense, so that the coercive force of the permanent magnet can be improved. The average distance $d_{Cu\text{-}rich}$ between the Cu-rich phases is preferably 160 nm or less, and more preferably 140 nm or less. However, when the average distance $d_{Cu\text{-}rich}$ between the Cu-rich phases is too small, a relative amount of the 2-17 phase reduces, which is liable to lower both the coercive force and the residual magnetization. The average distance $d_{Cu\text{-}rich}$ between the Cu-rich phases is preferably 20 nm or more, and more preferably 80 nm or more.

In the permanent magnet of the embodiment, in order to cause the sufficient progress of the two-phase separation and obtain the metallic structure including the Cu-rich phases having 20 nm or less of the average thickness $t_{Cu\text{-}rich}$ and 200 nm or less of the average distance $d_{Cu\text{-}rich}$ in the composition with 25 at % or more of the Fe concentration and 1.75 at % or less of the M concentration, it is effective to control a cooling rate after the solution treatment. The present inventors have focused attention on an amount of vacancies in the crystal in order to obtain the desired metallic structure in the composition with 25 at % or more of the Fe concentration and 1.75 at % or less of the M concentration. The progress of the phase separation from the 1-7 phase to the 2-17 phase and the Cu-rich phase is caused by the interdiffusion of the elements. By controlling such a diffusion behavior of the elements, it is possible to control the phase separation and a structure after the phase separation.

The diffusion of atoms in a solid material is a phenomenon occurring via vacancies. Unless a vacancy exists next to a certain atom, the atom cannot move. In order to increase a probability that the atom can move, it is effective to increase an amount of the vacancies. It is conjectured that this helps the diffusion of the atoms easily progress. In the permanent magnet of the embodiment, it is expected that increasing an amount of the vacancies in the 1-7 phase being a precursor makes the phase separation from the 1-7 phase to the 2-17 phase and the Cu-rich phase easily progress. An example of a method of leading a large amount of the vacancies into the 1-7 phase being the precursor of the phase separation structure is a process of rapid cooling to room temperature after the retention at a high temperature.

The number of the vacancies stably existing at a certain temperature rapidly increases in accordance with an increase in temperature. A concentration c of the vacancies, that is, a ratio (n/N) of the number n of the vacancies to the number N of atoms, at an absolute temperature T(K) is given by the following expression (2).

$$c=n/N=A\ \exp(-E_F/(kT)) \quad (2)$$

In the expression (2), the $E_F$ is energy necessary for forming one vacancy, that is, formation energy of the vacancy. The k is a Boltzmann constant, and the A is a constant. A crystal at the temperature T(K) turns into a stable equilibrium state when containing the vacancies given by the expression (2). At high temperatures, the vacancy concentration is high, while the number of interstitial atoms is very small. Therefore, as a result of the rapid cooling from a high temperature to room temperature, a material containing vacancies (point defects) in an excessive amount, that is, in an amount equal to or more than the equilibrium concentration at this temperature can be obtained. In order for the concentration of the vacancies in the equilibrium state at the high temperature to be kept at room temperature by the rapid cooling, the cooling rate needs to be sufficiently high. When the cooling rate is low, the vacancies disappear during the cooling.

The rapid cooling has been performed after the solution treatment also in a conventional manufacturing process of a Sm—Co-based magnet, but this is intended to maintain the 1-7 phase being a metastable phase at room temperature. It suffices that the cooling rate is high enough to maintain the 1-7 phase at room temperature. The rapid cooling after the solution treatment in the embodiment is carried out not only in order to maintain the 1-7 phase at room temperature but also in order to lead a large amount of the vacancies into the material having undergone the solution treatment. Therefore, it is necessary to set the cooling rate sufficiently high as compared with that of the conventional manufacturing process. In manufacturing the permanent magnet having the composition whose Fe concentration is 25 at % or more and M concentration is 1.75 at % or less, the rapid cooling at a rate of −170° C./min or more following the isothermal retention in the solution treatment step makes it possible to cause the sufficient progress of the two-phase separation and to stably obtain the aforesaid metallic structure. Therefore, it is possible to provide a Sm—Co-based magnet having high residual magnetization and a high coercive force. Further, by making the metallic structure uniform by the rapid cooling, it is possible to improve a squareness ratio of the Sm—Co-based magnet.

The composition of the permanent magnet of the embodiment can be measured by an inductively coupled plasma (ICP) emission spectrochemical analysis method. The measurement by the ICP emission spectrochemical analysis is done in the following procedure. First, a sample picked up from a predetermined measurement point is ground in a mortar, a predetermined amount of this ground sample is weighed and put into a quartz beaker. A mixed acid (containing nitric acid and hydrochloric acid) is put into the quartz beaker, which is heated to about 140° C. on a hotplate, whereby the sample is completely melted. After it is left standing to cool, it is transferred to a PFA volumetric flask and is subjected to an isovolumetric process to be a sample solution. Quantities of components of the sample solution were determined by a calibration curve method with the use of an ICP emission spectrochemical analyzer. As the ICP emission spectrochemical analyzer, SPS4000 (trade name) manufactured by SII Nano Technology Inc. is used, for instance.

It is possible to observe the metallic structure of the permanent magnet of the embodiment by using a transmission electron microscope (TEM). The TEM observation is preferably conducted with a magnification of 100 k to 200 k times. The metallic structure is observed on the cross section including the c-axis of the 2-17 phase being the cell phase. The Cu-rich phase being the cell wall phase is an area whose Cu concentration is 1.2 times or more of that of the 2-17 phase. For composition analysis of the elements such as Fe and Cu in the 2-17 phase and the Cu-rich phase, a TEM-energy dispersive X-ray spectroscopy (TEM-EDX) or a 3 dimensional atom probe (3DAP) is used, for instance.

The composition analysis using the TEM-EDX is carried out at 20 points of each of the phases. An average value of measurement values obtained after the maximum value and the minimum value are excluded from measurement values of each of the elements is defined as an analysis value of each of the elements. When the TEM-EDX is used, even if the Cu-rich phase is observed, it is not sometimes possible to accurately measure the Cu concentration in the Cu-rich phase because a transmission electron beam transmits through both of the Cu-rich phase and the 2-17 phase. Further, in the observation by the TEM-EDX, the element R concentration or the like sometimes becomes slightly higher (about 1.2 to about 1.5 times of the measurement value by the 3DAP). When the TEM-EDX is used, it is preferable to observe a point that is especially thin in a thin film sample.

In order to reduce the aforesaid measurement error, it is preferable to measure the concentrations of the elements in each of the phases by using the 3DAP. The measurement of the concentrations of the elements in the Cu-rich phase by the 3DAP is carried out according to the following procedure. As a pre-process, the sample is thinned by dicing, and from the thinned sample, a needle-shaped sample for pickup atom probe is fabricated by focused iron beam (FIB). An atom map is created based on spacing (about 0.4 nm) of atomic planes (0003) of the 2-17 phase. Regarding atom probe data thus created, a profile of only Cu is created, and a place where Cu thickens is specified. This part rich with Cu is the Cu-rich phase (cell wall phase).

The concentration profile of the target element is analyzed in a direction perpendicular to the Cu-rich phase. An analysis range of the concentration profile is preferably 5×5×10 nm. A highest value of the Cu concentration is found from the concentration profile analyzed in a range including the Cu-rich phase. Such measurement is conducted at 20 points in the same sample, and an average value of measurement values obtained after the maximum value and the minimum value are excluded from the measurement values of the Cu concentration (the highest value of the Cu concentration) is defined as the Cu concentration in the Cu-rich phase. The concentrations of the other elements are also measured in the same manner.

The measurement by the TEM-EDX or the 3DAP is conducted for the interior of a sintered compact. The measurement of the interior of the sintered compact means as follows. The composition is measured in a surface portion and the interior of a cross section cut at a center portion of the longest side in a surface having the largest area, perpendicularly to the side (perpendicularly to a tangent of the center portion in a case of a curve). Measurement points are as follows. Reference lines 1 and reference lines 2 are provided: the reference lines 1 being drawn from ½ positions of respective sides in the aforesaid cross section as starting points up to end portions toward an inner side perpendicularly to the sides; and the reference lines 2 being drawn from centers of respective corners as starting points up to end portions toward the inner side at ½ positions of interior angles of the corner portions, and 1% positions of the lengths of the reference lines from the starting points of these reference lines 1, 2 are defined as the surface portion and 40% positions are defined as the interior. When the corner portions have curvature because of chamfering or the like, points of intersection of extensions of adjacent sides are defined as end portions of the sides (centers of the corner portions). In this case, the measurement points are positions determined not based on the points of intersection but based on portions in contact with the reference lines.

When the measurement points are set as above, in a case where the cross section is, for example, a quadrangle, the number of the reference lines is totally eight, with the four reference lines 1 and the four reference lines 2, and the number of the measurement points is eight in each of the surface portion and the interior. In this embodiment, the eight points in each of the surface portion and the interior all preferably have the composition within the aforesaid range, but at least four points or more in each of the surface portion and the interior only need to have the composition within the aforesaid range. In this case, a relation between the surface portion and the interior of one reference line is not defined. The observation is conducted after an observation surface of the interior of the sintered compact thus defined is smoothed by polishing. The observation points by the TEM-EDX are arbitrary 20 points in the 2-17 phase and the Cu-rich phase, and an average value of measurement values obtained after the maximum value and the minimum value are excluded from the measurement values at these points is found, and this average value is set as the concentration of each element. This also applies to the measurement by the 3DAP.

The concentration profile of Cu in the Cu-rich phase by the 3DAP is preferably shaper. A full width at half maximum (FWHM) of the concentration profile of Cu is preferably 5 nm or less. When the distribution of Cu in the Cu-rich phase is sharp, a difference in domain wall energy sharply occurs between the 2-17 phase and the Cu-rich phase and the domain wall is more easily pinned. Therefore, the coercive force improves. The full width at half maximum (FWHM) of the concentration profile of Cu is found as follows. The highest value ($P_{Cu}$) of the Cu concentration is found from the Cu profile of the 3DAP, and a width of a peak whose value is half the aforesaid value ($P_{Cu}/2$) (the full width at half maximum) is found. Such measurement is conducted for ten peaks and an average value of obtained values is defined as the full width at half maximum (FWHM). The full width at half maximum of the Cu profile is preferably 3 nm or less, and more preferably 2 nm or less.

In the permanent magnet of the embodiment, the Cu-rich phase is a plate-shaped layer existing between the 2-17 phases. A thickness of the Cu-rich phase is a width of an area having a different contrast between grains having a uniform contrast and adjacent grains having a uniform contrast in a TEM image. The average thickness $t_{Cu-rich}$ of the Cu-rich phase is defined as an average value of values which are obtained when the width of the aforesaid area having the different contrast is measured at five points in the TEM image observed with a magnification of 100 k times.

The distance between the Cu-rich phases is a distance from a certain Cu-rich phase to the next Cu-rich phase in the TEM image of the cross section including the c-axis of the 2-17 phase. The average distance $d_{Cu-rich}$ between the Cu-rich phases is defined as an average value of distances between the Cu-rich phases obtained in all the composition line-analyses when the composition line-analysis of the TEM image observed with a magnification of 100 k times is carried out at 50 nm intervals. The composition line-analysis of the TEM image is carried out at 50 nm intervals in a first direction, and next is carried out at 50 nm intervals in a second direction perpendicular to the first direction. A concrete method of finding the average distance $d_{Cu-rich}$ between the Cu-rich phases is as follows.

First, the TEM observation is conducted with a magnification of 100 k times on the cross section including the c-axis of the 2-17 phase of the permanent magnet (the sintered compact having undergone the aging). The line analyses ($L_{a1}$ to $L_{an}$) are conducted at equal intervals in parallel in the first direction on the obtained TEM image. Next, on the same TEM image, the line analyses ($L_{b1}$ to $L_{bn}$) are conducted in parallel at equal intervals in the second direction perpendicular to the first direction. The interval is set to 50 nm in all the line analyses. In order to clarify a difference in the Cu concentration obtained by the line analyses, actual data of the Cu concentrations obtained by the line analyses are raised to the 2nd to 16th power, and the obtained values are graphed and an average value is found. In the graph of the data values ($n^{th}$ power values) obtained when the actual data of the Cu concentration are raised to the 2nd to 16th power, an area in which a width of a part at which the data values are continuously larger than twice the average value is 2 nm or more is regarded as the Cu-rich phase, and a position at which the data value is the largest in this area is regarded as a position of the Cu-rich phase.

In the graph plotting the data values ($n^{th}$ power values) of the Cu concentration, a distance from a peak presenting the largest data value ($n^{th}$ power value) of the Cu concentration to the next peak is measured as the distance between the Cu-rich phases. The distance between the Cu-rich phases in one line analysis is found as an average value of the inter-peak distances $d_1, d_2 \ldots d_n$. The measurement of the inter-phase distance is carried out for all the line analysis results, and average values ($d_{a1}$ to $d_{an}$ and $d_{b1}$ to $d_{bn}$) of the inter-phase distances in the respective line analysis results are found. An average value [($d_{a1}$+da$_2$ . . . +$d_{an}$+$d_{b1}$+$d_{b2}$ . . . +$b_{dn}$)/2n] of the inter-phase distances in the line analysis results thus found is defined as the average distance $d_{Cu-rich}$ between the Cu-rich phases.

The permanent magnet of this embodiment is fabricated as follows, for instance. First, an alloy powder containing predetermined amounts of elements is fabricated. The alloy powder is prepared by grinding an alloy ingot obtained through the casting of molten metal by, for example, an arc melting method or a high-frequency melting method. The alloy powder may be prepared by fabricating an alloy thin strip in a flake form by a strip cast method and thereafter grinding the alloy thin strip. In the strip cast method, it is preferable that the alloy molten metal is tiltingly injected to a chill roll rotating at a 0.1 m/sec to 20 m/sec circumferential speed and a thin strip with a 1 mm thickness or less is continuously obtained. When the circumferential speed of the chill roll is less than 0.1 m/sec, a composition variation is likely to occur in the thin strip, and when the circumferential speed is over 20 m/sec, crystal grains become fine to a single domain size or less, and a good magnetic property cannot be obtained. The circumferential speed of the chill roll is more preferably within a range of 0.3 m/sec to 15 m/sec, and still more preferably within a range of 0.5 m/sec to 12 m/sec.

Other examples of the method of preparing the alloy powder are a mechanical alloying method, a mechanical grinding method, a gas atomizing method, a reduction diffusion method, and the like. The alloy powder prepared by any of these methods may be used. The alloy powder thus obtained or the alloy before being ground may be heat-treated for homogenization when necessary. A jet mill, a ball mill, or the like is used for grinding the flake or the ingot. The grinding is preferably performed in an atmosphere of inert gas such as argon or in an organic solvent in order to prevent oxidization of the alloy powder.

The alloy powder obtained after the grinding preferably has 2 μm to 5 μm of an average grain size, and it is further preferable that a ratio of grains with a grain size of not less than 2 μm nor more than 10 μm is 80% or more of the whole powder. In order to obtain such a powder, the flake or the ingot is preferably ground by the jet mill that causes little generation of a fine powder. When a large amount of the fine powder is generated at the time of the grinding, it is difficult to selectively remove the fine powder thereafter. As a result, even if the average grain size is 2 μm to 5 μm, there is a possibility that a large amount of a fine powder on a sub-micron level is contained. When such a fine powder aggregates, it is difficult to cause a magnetic field orientation at the time of press-forming, and it may not be possible to obtain a good degree of orientation.

Further, when the Fe concentration is 25 at % or more, an amount of the hetero-phase in the flake or the ingot which becomes a raw material is likely to increase. Not only the amount of the hetero-phase but also its size tends to increase. The size of the hetero-phase sometimes becomes 20 μm or more. At the time of the grinding of the flake or the ingot, grains with 15 μm or more, if existing, sometimes become hetero-phase grains as they are. When the ground powder containing the hetero-phase grains is press-formed and sintered, a large hetero-phase exists in the sintered compact, which lowers properties such as the coercive force, the magnetization, and the squareness. The deterioration of the squareness makes the magnetization difficult, which lowers applicability in a motor or the like. In the alloy powder after the grinding, a ratio of grains with 10 μm or more is preferably 10% or less of the whole powder. This makes it possible to improve the coercive force while maintaining good squareness of the permanent magnet having a 25 at % Fe concentration or more.

Next, the alloy powder is filled in a mold installed in an electromagnet or the like and is press-formed while a magnetic field is applied. Consequently, a compression-molded body whose crystal axes are oriented is fabricated. By sintering the compression-molded body under appropriate conditions, the sintered compact is obtained. The sintering step of the compression-molded body is preferably performed in a vacuum atmosphere or an atmosphere of inert gas such as argon gas. Further, it is also effective to employ the combination of the sintering in the vacuum atmosphere and the sintering in the inert gas atmosphere. In this case, it is preferable that the compression-molded body is sintered in the vacuum atmosphere and next a temporary sintered compact is sintered in the inert gas atmosphere. For example, it is preferable that the vacuum atmosphere with $9 \times 10^{-2}$ Pa or less is kept until the temperature becomes close to a sintering temperature and thereafter the atmosphere is changed to the inert gas atmosphere and the sintering is performed therein. Such a sintering step makes it possible to obtain a high-density sintered compact.

The sintering temperature of the compression-molded body is preferably 1100° C. to 1300° C. When the sintering temperature is too high, Sm and so on are likely to evaporate. The sintering temperature is more preferably 1250° C. or lower, and still more preferably 1220° C. or lower. When the sintering temperature is too low, the density of the sintered compact lowers. The sintering temperature is more preferably 1150° C. or higher, and still more preferably 1160° C. or higher. \ retention time at the sintering temperature is preferably 0.5 hours to fifteen hours. Consequently, a dense sintered compact can be obtained. When the sintering time is less than 0.5 hours, the density of the sintered compact is likely to be uneven. When the sintering time is over fifteen hours, Sm and so on in the alloy powder evaporate, so that a good magnetic property may not be obtained. The sintering time is more preferably one hour to ten hours, and still more preferably one hour to four hours.

Next, the solution treatment and the aging are applied to the obtained sintered compact to control the crystal structure. The solution treatment is preferably carried out by keeping a temperature within a range of 1100° C. to 1200° C. for 0.5 hours to eight hours in order to obtain the 1-7 phase being the precursor of the phase separation structure. When the temperature is lower than 1100° C. or is over 1200° C., a ratio of the 1-7 phase in the sample having undergone the solution treatment is small and a good magnetic property is not obtained. The temperature of the solution treatment more preferably falls within a range of 1120° C. to 1180° C., and still more preferably within a range of 1120° C. to 1170° C. When the solution treatment time is less than 0.5 hours, the constituent phases are likely to become uneven. When the solution treatment time is over eight hours, the element R such as Sm evaporates, which is liable to make it impossible to obtain a good magnetic property. The solution treatment time is more preferably within a range of one hour to eight hours, and still more preferably within a range of one hour to four hours. For the prevention of oxidization, the solution treatment is preferably performed in a vacuum or inert gas atmosphere.

In obtaining the permanent magnet of the embodiment, the rapid cooling follows the isothermal retention in the solution treatment step. The rapid cooling step is carried out not only for the purpose of keeping the 1-7 phase at room temperature but also for the purpose of leading a large amount of vacancies into the material having undergone the solution treatment. If the purpose is only to keep the 1-7 phase at room temperature, it is not necessary to strictly control the cooling rate. On the other hand, a vacancy concentration is greatly influenced by the cooling rate, and further, the metallic structure after the aging, concretely, the thickness of the Cu-rich phase and the distance between the Cu-rich phases change. Therefore, the rapid cooling rate after the isothermal retention in the solution treatment step is preferably −170° C./min or more. The rapid cooling is preferably carried out from the solution treatment temperature to a temperature of about 500° C. to about 800° C. After the rapid cooling to such a temperature, this temperature is kept for a predetermined time, and the temperature is gradually decreased to room temperature.

Employing the above-described rapid cooling step where the cooling rate is set to −170° C./min or more makes it possible to lead many vacancies into the crystal having undergone the solution treatment. The atom diffusion progresses via the vacancies at the time of the aging. Consequently, the two-phase separation sufficiently progresses, making it possible to clearly form the Cu-rich phase, which makes it possible to enhance the pinning effect of the domain wall. The rapid cooling rate in the solution treatment step is more preferably −200° C./min or more, and still more preferably −300° C./min or more. The cooling rate can be measured in such a manner that a temperature sensor (thermocouple or the like) is disposed in a floating state at a place within a 50 mm radius from the sample being a temperature measurement target and a temperature change thereof is monitored.

When the rapid cooling rate in the solution treatment step is less than −170° C./min, the thickening of Cu to the Cu-rich phase becomes insufficient because an amount of the vacancies reduces and the atom diffusion is difficult to progress. The distribution of Cu becomes broad and the thickness of the Cu-rich phase becomes large. Such a Cu-rich phase has a weak force of pinning the domain wall, and cannot be expected to contribute to the exhibition of a sufficient coercive force. When the rapid cooling rate is low, the distance between the Cu-rich phases tends to become large. This means that a distance between the pinning sites of the domain wall becomes long. Not only a high coercive force is difficult to obtain, but also the squareness of the permanent magnet is likely to worsen. When the rapid cooling rate is less than −170°/min, a $Ce_2Ni_7$ crystal phase (hereinafter referred to as the 2-7 phase) being a low-temperature hetero-phase is likely to be generated in the R—Co—Fe—Cu-M-based alloy containing 25 at % Fe or more during the cooling. The generation of the 2-7 phase causes a change in the composition of a parent phase, making the phase separation itself difficult. Even if the phase separation occurs, the compositions of the respective phases of the cell structure become disordered, and a good magnetic property cannot be obtained.

A crystal lattice constant ratio (c/a) of the sample having undergone the solution treatment is preferably 0.842 or less. When the Fe concentration increases, a Fe pair (Fe dumbbell) is substituted at a position of the element R in the crystal. The c/a ratio tends to increase because the number of the substitutions increases. However, as a result of the rapid cooling at the cooling rate of 170° C./min or more, the vacancy makes a pair with the element M, and it is expected that the formation of the Fe dumbbell is suppressed. Therefore, in the sample fabricated at the cooling rate of 170° C./min or more, the c/a ratio can be 0.842 or less even though the Fe concentration in the main phase is 25 at % or more. When the c/a ratio is 0.842 or less, it is possible to sufficiently lead the vacancies. Therefore, a high coercive force is exhibited in the aging. The c/a ratio is more preferably 0.839 or less. The crystal lattice constant is found by a least square method as a $TbCu_7$ crystal. A sample for X-ray diffraction is prepared in such a manner that a center portion of the material having undergone the solution treatment is cut out, and the center portion is ground in a mortar to be turned into a 100 μm powder or less. The X-ray diffraction is carried out by using Cu-Kα as a radiation source under room temperature, with a 2θ range being set to 20° to 60°.

Next, the sintered compact having undergone the solution treatment is subjected to the aging. The aging is treatment to control the crystal structure to enhance the coercive force of the magnet. The aging is preferably carried out in such a manner that the sintered compact is kept at a temperature of 700° C. to 900° C. for 0.5 hours to eighty hours, thereafter is gradually cooled to a temperature of 400° C. to 650° C. at a cooling rate of 0.2° C./min to 2° C./min, and is subsequently cooled to room temperature. The aging may be performed by two-stage heat treatment. The aforesaid heat treatment is the first stage and after the temperature is gradually decreased to 400° C. to 650° C., the second-stage heat treatment is subsequently performed. After the temperature of the second-stage heat treatment is kept for a certain time, the temperature is decreased to room temperature by furnace cooling. In order to prevent oxidation, the aging is preferably performed in a vacuum atmosphere or an atmosphere of inert gas such as Ar gas.

When the aging temperature is lower than 700° C. or is over 900° C., it is not possible to obtain a uniform mixed structure of the 2-17 phase (cell phase) and the Cu-rich phase (cell wall phase), which is liable to deteriorate the magnetic property of the permanent magnet. The aging temperature is more preferably 750° C. to 880° C., and still more preferably 780° C. to 850° C. When the aging time is less than 0.5 hours, the precipitation of the Cu-rich phase (cell wall phase) from the 1-7 phase may not be fully completed. When the retention time is over eighty hours, the thickness of the Cu-rich phase (cell wall phase) becomes large, so that it is not possible to obtain a good magnetic property. The aging time is more preferably four hours to sixty hours, and still more preferably eight hours to forty hours.

When the cooling rate after the aging heat treatment is less than 0.2° C./min, the thickness of the Cu-rich phase (cell wall phase) becomes too large. Accordingly, a good magnetic property cannot be obtained. When the cooling rate after the aging heat treatment is over 2° C./rain, it is not possible to obtain a uniform mixed structure of the 2-17 phase (cell phase) and the Cu-rich phase (cell wall phase), which is liable to deteriorate the magnetic property of the permanent magnet. The cooling rate after the aging heat treatment is more preferably 0.4° C./min to 1.5° C./min, and still more preferably 0.5° C./min to 1.3° C./min. The aging is not limited to the two-stage heat treatment but may be heat treatment in more multiple stages (cooling in multiple stages). As a pre-process of the aging, it is also effective to perform preliminary aging at a lower temperature and for a shorter time than those of the aging. Consequently, an improvement in the squareness of a magnetization curve is expected. Concretely, by setting the temperature of the preliminary aging to 650° C. to 790° C., setting the treatment time to 0.5 hours to four hours, and setting the gradual cooling rate after the aging to 0.5° C./min to 1.5° C./min, the improvement in the squareness of the permanent magnet is expected.

The permanent magnet of this embodiment is usable in various kinds of motors and power generators. The permanent magnet of the embodiment is suitable for a permanent magnet motor and a permanent magnet power generator. The permanent magnet motor (permanent magnet power generator) is excellent in efficiency as compared with a conventional induction motor (power generator), and can be downsized and can have a reduced noise. The permanent magnet motor is becoming in wide use as driving motors and the like of HEV, EV, and railway cars. Applying the permanent magnet of the embodiment to the permanent magnet motor and the permanent magnet power generator enables a further increase in efficiency, further downsizing, and further cost reduction, and so on. The permanent magnet of the embodiment is also usable as a stationary magnet and a variable magnet of a variable magnetic flux motor and a variable magnetic flux power generator. Arts disclosed in Japanese Patent Application Laid-open No. 2008-29148 and Japanese Patent Application Laid-open No. 2008-43172 are applicable as a structure and a drive system of the variable magnetic flux motor.

Figure 1:
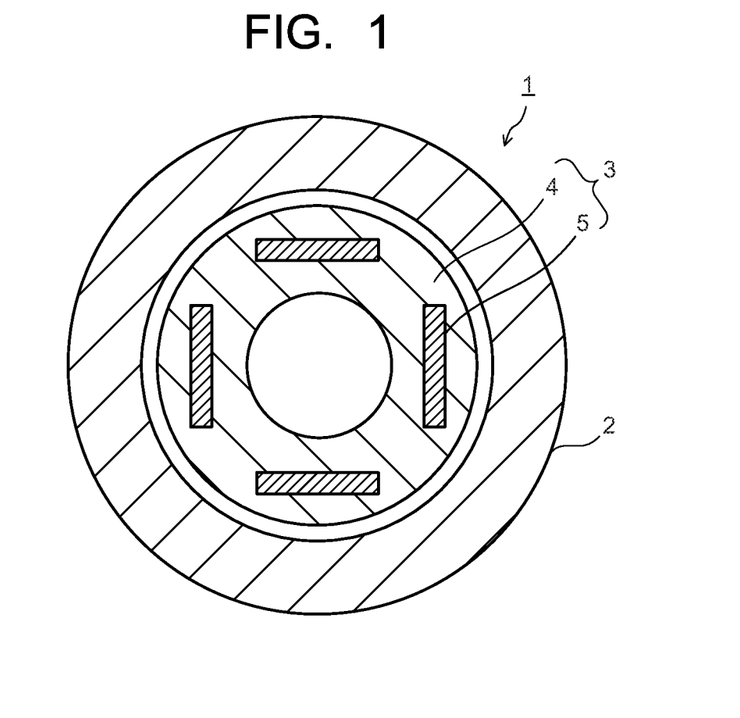
FIG. 1 is a view showing a permanent magnet motor of an embodiment.

Next, a motor and a power generator of embodiments will be described with reference to the drawings. FIG. 1 shows a permanent magnet motor according to an embodiment. In the permanent magnet motor 1 shown in FIG. 1, a rotor (rotating part) 3 is disposed in a stator (stationary part) 2. In an iron core 4 of the rotor 3, the permanent magnets 5 of the embodiment are disposed. Based on the properties and so on of the permanent magnets of the embodiment, it is possible to realize efficiency enhancement, downsizing, cost reduction, and so on of the permanent magnet motor 1.

Figure 2:
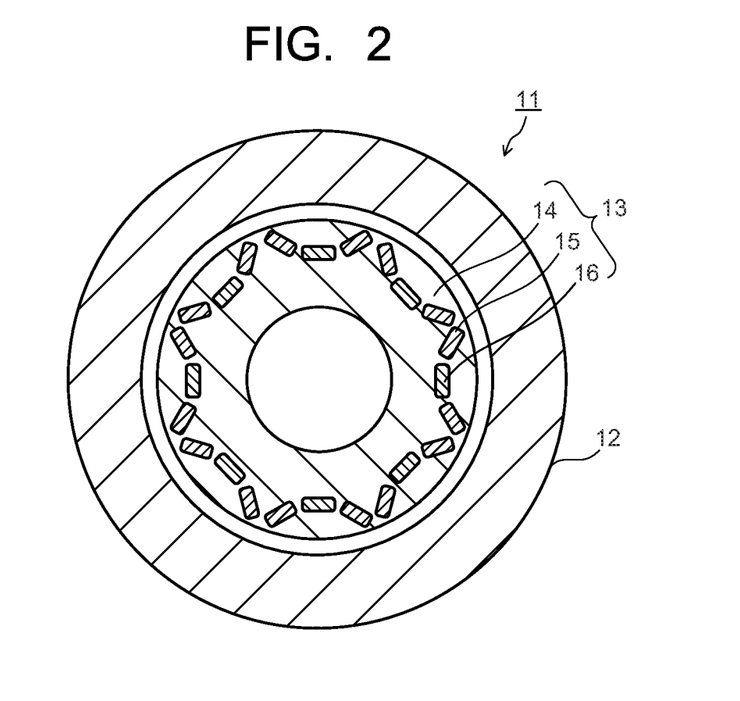
FIG. 2 is a view showing a variable magnetic flux motor of an embodiment.

FIG. 2 shows a variable magnetic flux motor according to an embodiment. In the variable magnetic flux motor 11 shown in FIG. 2, a rotor (rotating part) 13 is disposed in a stator (stationary part) 12. In an iron core 14 of the rotor 13, the permanent magnets of the embodiment are disposed as stationary magnets 15 and variable magnets 16. Magnetic flux density (flux quantum) of the variable magnets 16 is variable. The variable magnets 16 are not influenced by a Q-axis current because their magnetization direction is orthogonal to a Q-axis direction, and can be magnetized by a D-axis current. In the rotor 13, a magnetized winding (not shown) is provided. When a current is passed through the magnetized winding from a magnetizing circuit, its magnetic field acts directly on the variable magnets 16.

According to the permanent magnet of the embodiment, it is possible to obtain a suitable coercive force in the stationary magnets 15. When the permanent magnets of the embodiment are applied to the variable magnets 16, the coercive force is controlled to, for example, a 100 kA/m to 500 kA/m range by changing the various conditions (aging condition and so on) of the aforesaid manufacturing method. In the variable magnetic flux motor 11 shown in FIG. 2, the permanent magnets of the embodiment are usable as both of the stationary magnets 15 and the variable magnets 16, but the permanent magnets of the embodiment may be used as either of the magnets. The variable magnetic flux motor 11 is capable of outputting a large torque with a small device size and thus is suitable for motors of hybrid vehicles and electric vehicles whose motors are required to have a high output and a small size.

Figure 3:
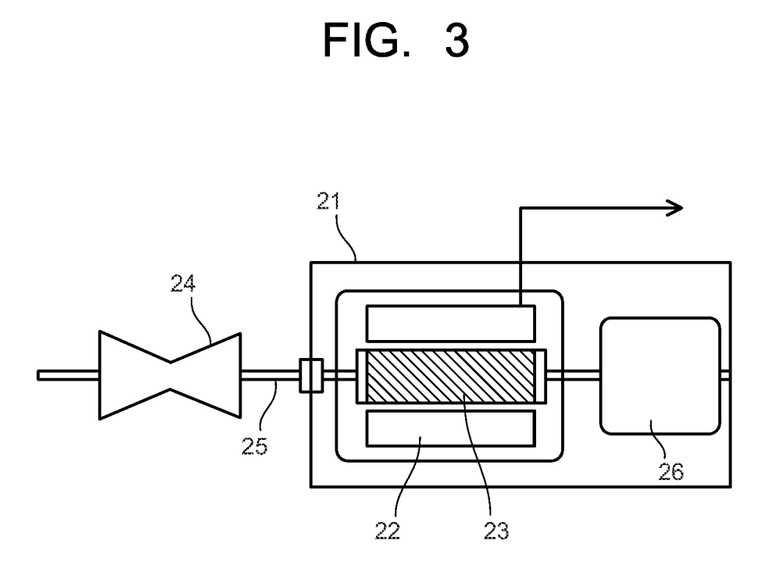
FIG. 3 is a view showing a power generator of an embodiment.

FIG. 3 shows a power generator according to an embodiment. The power generator 21 shown in FIG. 3 includes a stator (stationary part) 22 using the permanent magnet of the embodiment. A rotor (rotating part) 23 disposed inside the stator (stationary part) 22 is connected via a shaft 25 to a turbine 24 provided at one end of the power generator 21. The turbine 24 rotates by an externally supplied fluid, for instance. Instead of the turbine 24 rotating by the fluid, the shaft 25 may be rotated by the transmission of dynamic rotation such as regenerative energy of a vehicle. As the stator 22 and the rotor 23, various kinds of generally known structures are adoptable.

The shaft 25 is in contact with a commutator (not shown) disposed on the rotor 23 opposite the turbine 24, and an electromotive force generated by the rotation of the rotor 23 is boosted to system voltage to be transmitted as an output of the power generator 21 via an isolated phase bus and a traction transformer (not shown). The power generator 21 may be either of an ordinary power generator and a variable magnetic flux power generator. Note that the rotor 23 is electrically charged due to static electricity from the turbine 24 and a shaft current accompanying the power generation. Therefore, the power generator 21 includes a brush 26 for discharging the charged electricity of the rotor 23.

Next, examples and their evaluation results will be described.

Examples 1, 2

Raw materials were weighed and mixed at predetermined ratios, and the resultants were arc-melted in an Ar gas atmosphere, whereby alloy ingots were fabricated. After the alloy ingots were heat-treated at 1175° C. for eight hours, they were roughly ground and then finely ground by a jet mill, whereby alloy powders as raw material powders of permanent magnets were prepared. The alloy powders were each press-formed in a magnetic field, whereby compression-molded bodies were fabricated. The compression-molded bodies of the alloy powders were each disposed in a chamber of a firing furnace, and the chamber was vacuum-exhausted until its degree of vacuum became $5.0 \times 10^{-3}$ Pa. In this state, a temperature in the chamber was raised up to 1165° C., and after the chamber was kept at this temperature for two minutes, Ar gas was led into the chamber. The temperature in the chamber set to the Ar atmosphere was raised up to 1195° C., and while this temperature was kept for six hours, main sintering was performed.

Subsequently to the main sintering step, the sintered compacts were subjected to solution treatment while kept at 1165° C. for six hours. They were isothermally kept at 1160° C., and they were rapidly cooled to 720° C. at a cooling rate of −250° C./min. Further, after being kept at 720° C. for one hour, they were gradually cooled to room temperature. Next, the sintered compacts having undergone the solution treatment were aged while being kept at 795° C. for 45 hours, and they were gradually cooled to 400° C. They were furnace-cooled to room temperature, whereby intended sintered magnets were obtained. The compositions of the sintered magnets are as shown in Table 1. According to the previously described methods, an average thickness $t_{Cu\text{-}rich}$ of Cu-rich phases and an average distance $d_{Cu\text{-}rich}$ between the Cu-rich phases were measured. Further, magnetic properties of the sintered magnets were evaluated by a BH tracer and their coercive force and residual magnetization were measured. The results are shown in Table 2.

Examples 3 to 5

Raw materials were weighed and mixed at predetermined ratios, and the resultants were arc-melted in an Ar gas atmosphere, whereby alloy ingots were fabricated. After the alloy ingots were heat-treated at 1165° C. for four hours, they were roughly ground and then finely ground by a jet mill, whereby alloy powders as raw material powders of permanent magnets were prepared. The allow powders were each press-formed in a magnetic field, whereby compression-molded bodies of the alloy powders were fabricated. The compression-molded bodies of the alloy powders were each disposed in a chamber of a firing furnace, and the chamber was vacuum-exhausted until its degree of vacuum became $5.0 \times 10^{-3}$ Pa. In this state, a temperature in the chamber was raised up to 1160° C., and after this temperature was kept for fifteen minutes, Ar gas was led into the chamber. The temperature in the chamber set to the Ar atmosphere was raised up to 1190° C., and while this temperature was kept for four hours, main sintering was performed.

Subsequently to the main sintering step, the sintered compacts were subjected to solution treatment while kept at 1145° C. for eight hours. The sintered compacts were isothermally kept at 1145° C., and they were rapidly cooled to 750° C. at a cooling rate of −310° C./rain. Further, they were kept at 750° C. for two hours, and they were gradually cooled to room temperature. Next, the sintered compacts having undergone the solution treatment were subjected to aging while kept at 850° C. for fifteen hours, and they were gradually cooled to 400° C. They were furnace-cooled to room temperature after kept at 400° C. for four hours, whereby intended sintered magnets were obtained. The compositions of the sintered magnets are as shown in Table 1. Regarding each of the obtained sintered magnets, an average thickness $t_{Cu\text{-}rich}$ of Cu-rich phases, an average distance $d_{Cu\text{-}rich}$ between the Cu-rich phases, a coercive force, and residual magnetization were measured in the same manners as those of the example 1. The measurement results are shown in Table 2.

Example 6

Raw materials were weighed and mixed at a predetermined ratio, and the resultant was high-frequency-melted in an Ar gas atmosphere, whereby an alloy ingot was fabricated. After roughly ground and heat-treated at 1170° C. for two hours, the alloy ingot was rapidly cooled to room temperature. The obtained powder was finely ground by a jet mill, whereby an alloy powder as a raw material powder of a permanent magnet was prepared. The allow powder was press-formed in a magnetic field, whereby a compression-molded body was fabricated. The compression-molded body of the alloy powder was disposed in a chamber of a firing furnace, and the chamber was vacuum-exhausted until its degree of vacuum became $9.0 \times 10^{-3}$ Pa. In this state, a temperature in the chamber was raised up to 1160° C., and after this temperature was kept for ten minutes, Ar gas was led into the chamber. The temperature in the chamber set to the Ar atmosphere was raised up to 1190° C., and while this temperature was kept for four hours, main sintering was performed.

Subsequently to the main sintering step, the sintered compact was subjected to solution treatment while kept at 1130° C. for twelve hours. The sintered compact was isothermally kept at 1130° C., and it was rapidly cooled to 750° C. at a cooling rate of −270° C./min. Further, after kept at 750° C. for 1.5 hours, it was gradually cooled to room temperature. Next, the sintered compact having undergone the solution treatment was subjected to aging while kept at 800° C. for 42 hours, and it was gradually cooled to 350° C. It was furnace-cooled to room temperature after kept at 350° C. for four hours, whereby an intended sintered magnet was obtained. The composition of the sintered magnet is as shown in Table 1. Regarding the obtained sintered magnet, an average thickness $t_{Cu\text{-}rich}$ of Cu-rich phases, an average distance $d_{Cu\text{-}rich}$ between the Cu-rich phases, a coercive force, and residual magnetization were measured in the same manners as those of the example 1. The measurement results are shown in Table 2.

Example 7

A sintered magnet was fabricated by the same method as that of the example 6 except that the cooling rate after the isothermal retention in the solution treatment step was set to −370° C./min. Regarding the obtained sintered magnet, an average thickness $t_{Cu\text{-}rich}$ of Cu-rich phases, an average distance $d_{Cu\text{-}rich}$ between the Cu-rich phases, a coercive force, and residual magnetization were measured in the same manners as those of the example 1. The measurement results are shown in Table 2.

Example 8

A sintered magnet was fabricated by the same method as that of the example 6 except that the cooling rate after the isothermal retention in the solution treatment step was set to −170° C./min. Regarding the obtained sintered magnet, an average thickness $t_{Cu\text{-}rich}$ of Cu-rich phases, an average distance $d_{Cu\text{-}rich}$ between the Cu-rich phases, a coercive force, and residual magnetization were measured in the same manners as those of the example 1. The measurement results are shown in Table 2.

Comparative Examples 1 to 2

Sintered magnets having the compositions shown in Table 1 were fabricated by employing the same manufacturing method as that of the example 1. Regarding each of the obtained sintered magnets, an average thickness $t_{Cu\text{-}rich}$ of Cu-rich phases, an average distance $d_{Cu\text{-}rich}$ between the Cu-rich phases, a coercive force, and residual magnetization were measured in the same manners as those of the example 1. The measurement results are shown in Table 2.

Comparative Examples 3 to 4

Sintered magnets having the compositions shown in Table 1 were fabricated by employing the same manufacturing method as that of the example 1. Regarding each of the obtained sintered magnets, an average thickness $t_{Cu\text{-}rich}$ of Cu-rich phases, an average distance $d_{Cu\text{-}rich}$ between the Cu-rich phases, a coercive force, and residual magnetization were measured in the same manners as those of the example 1. The measurement results are shown in Table 2.

Comparative Example 5

A sintered magnet was fabricated by the same method as that of the example 6 except that the cooling rate after the isothermal retention in the solution treatment step was set to −100° C./min. Regarding the obtained sintered magnet, an average thickness $t_{Cu-rich}$ of Cu-rich phases, an average distance $d_{Cu-rich}$ between the Cu-rich phases, a coercive force, and residual magnetization were measured in the same manners as those of the example 1. The measurement results are shown in Table 2.

TABLE 1

| | Composition of Magnet (at %) |
|---|---|
| Example 1 | $Sm_{10.22}Ce_{0.89}Co_{54.97}Fe_{25.07}Cu_{7.11}Zr_{1.74}$ |
| Example 2 | $Sm_{11.76}Co_{53.23}Fe_{26.03}Cu_{7.24}Zr_{1.70}Ti_{0.04}$ |
| Example 3 | $Sm_{10.64}Co_{52.62}Fe_{29.66}Cu_{5.27}Zr_{1.72}Mn_{0.09}$ |
| Example 4 | $Sm_{11.24}Co_{50.85}Fe_{31.07}Cu_{5.24}Zr_{1.60}$ |
| Example 5 | $Sm_{11.24}Co_{52.46}Fe_{29.19}Cu_{5.33}Zr_{1.69}Cr_{0.09}$ |
| Example 6 | $Sm_{11.30}Co_{53.65}Fe_{28.21}Cu_{5.14}Zr_{1.70}$ |
| Example 7 | $Sm_{11.30}Co_{53.65}Fe_{28.21}Cu_{5.14}Zr_{1.70}$ |
| Example 8 | $Sm_{11.30}Co_{53.65}Fe_{28.21}Cu_{5.14}Zr_{1.70}$ |
| Comparative Example 1 | $Sm_{10.22}Ce_{0.89}Co_{56.92}Fe_{23.12}Cu_{7.11}Zr_{1.74}$ |
| Comparative Example 2 | $Sm_{9.71}Co_{54.47}Fe_{26.64}Cu_{7.40}Zr_{1.74}Ti_{0.04}$ |
| Comparative Example 3 | $Sm_{11.30}Co_{53.40}Fe_{28.21}Cu_{5.14}Zr_{1.95}$ |
| Comparative Example 4 | $Sm_{11.30}Co_{54.06}Fe_{28.21}Cu_{5.14}Zr_{1.29}$ |
| Comparative Example 5 | $Sm_{11.30}Co_{53.65}Fe_{28.21}Cu_{5.14}Zr_{1.70}$ |

TABLE 2

| | Average thickness $t_{Cu-rich}$ of Cu-rich phases [nm] | Average distance $d_{Cu-rich}$ between Cu-rich phases [nm] | Residual magnetization Mr [T] | Coercive force iHc [kA/m] |
|---|---|---|---|---|
| Example 1 | 9 | 110 | 1.183 | 1740 |
| Example 2 | 12 | 140 | 1.185 | 1680 |
| Example 3 | 16 | 189 | 1.212 | 1550 |
| Example 4 | 11 | 129 | 1.229 | 1470 |
| Example 5 | 10 | 155 | 1.205 | 1570 |
| Example 6 | 14 | 155 | 1.200 | 1640 |
| Example 7 | 10 | 105 | 1.201 | 1710 |
| Example 8 | 18 | 192 | 1.119 | 1380 |
| Comparative Example 1 | 22 | 166 | 1.090 | 1700 |
| Comparative Example 2 | 3 | 241 | 1.187 | 310 |
| Comparative Example 3 | 2 | 369 | 1.160 | 280 |
| Comparative Example 4 | 2 | 534 | 1.190 | 125 |
| Comparative Example 5 | 25 | 234 | 1.150 | 515 |

As is apparent from Table 2, it is seen that the sintered magnets of the examples 1 to 8 have high residual magnetization and a high coercive force. Being low in the Fe concentration, the sintered magnet of the comparative example 1 does not have sufficient residual magnetization. Being low in the Sm concentration, the sintered magnet of the comparative example 2 does not have a sufficient coercive force. The sintered magnet of the comparative example 3 has too high a Zr concentration, and the sintered magnet of the comparative example 4 has too low a Zr concentration, and therefore, their residual magnetization and coercive force are both low. The sintered magnet of the comparative example 5 does not have a desired metallic structure, and therefore, its residual magnetization and coercive force are both low.

Example 9

The variable magnetic flux motor shown in FIG. 2 was assembled by using the permanent magnets of the example 1 to 8, and it was possible to achieve efficiency enhancement, downsizing, and cost reduction as compared with a conventional motor.

Example 10

The power generator shown in FIG. 3 was assembled by using the permanent magnets of the examples 1 to 8, and it was possible to achieve efficiency enhancement, downsizing, and cost reduction as compared with a conventional power generator.

While certain embodiments have been described, these embodiments have been presented by way of example only, and are not intended to limit the scope of the inventions. Indeed, the novel methods described herein may be embodied in a variety of other forms; furthermore, various omissions, substitutions and changes in the form of the methods described herein may be made without departing from the spirit of the inventions. The accompanying claims and their equivalents are intended to cover such forms or modifications as would fall within the scope and spirit of the inventions.

What is claimed is:

1. A permanent magnet, comprising:
a composition expressed by a composition formula:

$$R_pFe_qM_rCu_sCo_{100-p-q-r-s},$$

wherein R is at least one element selected from the group consisting of rare-earth elements, M is at least one element selected from the group consisting of zirconium (Zr), titanium (Ti), and hafnium (Hf), p satisfies 11.24≤p≤13.5 at %, q satisfies 25≤q≤40 at %, r satisfies 1.35≤r≤1.72 at %, and s satisfies 0.88≤s≤5.33 at %; and
a metallic structure including $Th_2Zn_{17}$ crystal phases each having a Fe concentration of 25 at % or more, and Cu-rich crystal phases each having a Cu concentration of from 25 at % to 70 at %,
wherein an average thickness of the Cu-rich crystal phases is 20 nm or less, and an average distance between the Cu-rich crystal phases is 200 nm or less, and
wherein a coercive force of the magnet is 1640 kA/m or more and 1710 kA/m or less, and a residual magnetization of the magnet is 1.185 T or more and 1.229 T or less.

2. The permanent magnet according to claim 1, wherein the average thickness of the Cu-rich crystal phases is from 4 nm to 16 nm.

3. The permanent magnet according to claim 1, wherein the average distance between the Cu-rich crystal phases is from 20 nm to 160 nm.

4. The permanent magnet according to claim 1, wherein the Fe concentration of the $Th_2Zn_{17}$ crystal phase is 28 at % or more.

5. The permanent magnet according to claim 1, wherein 50 at % or more of the element R is samarium (Sm).

6. The permanent magnet according to claim 1, wherein 50 at % or more of the element M is zirconium (Zr).

7. A motor comprising the permanent magnet of claim 1.

8. The motor according to claim 7, wherein the motor is a variable magnetic flux motor comprising the permanent magnet as a variable magnet.

9. A power generator comprising the permanent magnet of claim 1.

10. The permanent magnet according to claim 1, wherein q satisfies 28≤q≤40 at %.

11. The permanent magnet according to claim 1, wherein q satisfies 30≤q≤40 at %.

12. A permanent magnet, comprising:

a composition expressed by a composition formula:

$R_p Fe_q M_r Cu_s (Co_{1-t} A_t)_{100-p-q-r-s}$, wherein R is at least one element selected from the group consisting of rare-earth elements, M is at least one element selected from the group consisting of zirconium (Zr), titanium (Ti), and hafnium (Hf), A is at least one element selected from the group consisting of nickel (Ni), vanadium (V), chromium (Cr), manganese (Mn), aluminum (Al), gallium (Ga), niobium (Nb), tantalum (Ta), and tungsten (W), p satisfies 11.24≤p≤13.5 at %, q satisfies 25≤q≤40 at %, r satisfies 1.35≤r≤1.72 at %, s satisfies 0.88≤s≤5.33 at %, and t is an atomic ratio satisfying 0≤t≤0.2; and a metallic structure including $Th_2Zn_{17}$ crystal phases each having a Fe concentration of 25 at % or more, and Cu-rich crystal phases each having a Cu concentration of from 25 at % to 70 at %, wherein an average thickness of the Cu-rich crystal phases is 20 nm or less, and an average distance between the Cu-rich crystal phases is 200 nm or less, and wherein a coercive force of the magnet is 1640 kA/m or more and 1710 kA/m or less, and a residual magnetization of the magnet is 1.185 T or more and 1.229 T or less.

* * * * *